(12) United States Patent
O'Herlihy et al.

(10) Patent No.: US 11,288,649 B2
(45) Date of Patent: Mar. 29, 2022

(54) ENHANCED SERVICE SYSTEM FOR A DRIVE THROUGH FACILITY

(71) Applicant: Everseen Limited, Blackpool (IE)

(72) Inventors: Alan O'Herlihy, Glenville (IE); Dan Alexandru Pescaru, Timisoara (RO); Ciprian David, Timisoara (RO); Cosmin Cernazanu-Glavan, Timisoara (RO); Vasile Gui, Timisoara (RO); Joe Allen, Ballybunion (IE); Bogdan Ciubotaru, Donoughmore (IE); Mark Ibbotson, Bentonville, AR (US); Raymond Hegarty, Dublin (IE); Margaret Hartnett, Dublin (IE)

(73) Assignee: Everseen Limited, Blackpool (IE)

( * ) Notice: Subject to any disclaimer, the term of this patent is extended or adjusted under 35 U.S.C. 154(b) by 0 days.

(21) Appl. No.: 17/335,448

(22) Filed: Jun. 1, 2021

(65) Prior Publication Data
US 2021/0383345 A1     Dec. 9, 2021

(30) Foreign Application Priority Data
Jun. 3, 2020 (GB) .................................... 2008382

(51) Int. Cl.
| | |
|---|---|
| *G06Q 20/20* | (2012.01) |
| *G07F 11/58* | (2006.01) |
| *G06Q 50/12* | (2012.01) |

(52) U.S. Cl.
CPC ......... *G06Q 20/204* (2013.01); *G06Q 20/201* (2013.01); *G06Q 50/12* (2013.01); *G07F 11/58* (2013.01)

(58) Field of Classification Search
CPC .... G06Q 20/204; G06Q 20/201; G06Q 50/12; G07F 11/58
See application file for complete search history.

(56) References Cited

U.S. PATENT DOCUMENTS

| | | |
|---|---|---|
| 3,633,296 A | 1/1972 | Brenner |
| 3,735,513 A | 5/1973 | Constant, Jr. et al. |
| | (Continued) | |

FOREIGN PATENT DOCUMENTS

| | | |
|---|---|---|
| CN | 203745904 U | 7/2014 |
| CN | 103654205 B | 6/2015 |
| | (Continued) | |

OTHER PUBLICATIONS

A. Antony and P. Sivraj, "Food Delivery Automation in Restaurants Using Collaborative Robotics," 2018 International Conference on Inventive Research in Computing Applications (ICIRCA), 2018, pp. 111-117, doi: 10.1109/ICIRCA.2018.8597280. (Year: 2018).*

(Continued)

*Primary Examiner* — Dennis W Ruhl
*Assistant Examiner* — Matthew S Weronski
(74) *Attorney, Agent, or Firm* — Young Basile Hanlon & MacFarlane, P.C.

(57) ABSTRACT

An enhanced service system comprises a pair of first wires between a first position proximal to an entry point of a drive through facility and a second position proximal to a receiving window in the drive through facility, and an aerial host unit coupled to the pair of first wires using a pair of first and second host wires. The aerial host unit is longitudinally movable between the first position and the second position and includes an aerial host member moveably supported by the first and second host wires to move laterally between the pair of first wires to approach an incoming customer vehicle, facilitate the customer to place an order, receive payment from the customer, and direct the customer to the receiving window where the aerial host member retrieves the items corresponding to the placed order from the receiving window and transfers the retrieved items to the customer.

19 Claims, 4 Drawing Sheets

(56) References Cited

U.S. PATENT DOCUMENTS

| | | | | |
|---|---|---|---|---|
| 5,113,970 A | * | 5/1992 | Bavis | A47F 10/06 186/41 |
| 5,113,974 A | | 5/1992 | Vayda | |
| 2017/0334062 A1 | | 11/2017 | Mien et al. | |
| 2019/0279181 A1 | * | 9/2019 | Kelly | G06Q 20/202 |
| 2020/0286069 A1 | * | 9/2020 | Pearson | G06Q 20/027 |

FOREIGN PATENT DOCUMENTS

| | | | | |
|---|---|---|---|---|
| CN | 104951911 A | | 9/2015 | |
| CN | 105965517 A | | 9/2016 | |
| CN | 107688936 A | | 2/2018 | |
| CN | 106393130 B | | 7/2018 | |
| CN | 110026994 A | | 7/2019 | |
| CN | 209654909 U | | 11/2019 | |
| CN | 110638216 A | | 1/2020 | |
| CN | 110790150 A | | 2/2020 | |
| GB | 2207406 A | | 2/1989 | |
| JP | S62105763 A | | 5/1987 | |
| JP | H0990880 A | | 4/1997 | |
| KR | 20170112487 A | | 10/2017 | |
| WO | 2019/014027 A1 | | 1/2019 | |
| WO | WO-2019014027 A1 | * | 1/2019 | G07F 9/026 |

OTHER PUBLICATIONS

International Search Report for Application No. PCT/IB2021/054813, dated Sep. 1, 2021.
Search Report for Application No. GB2008382.0, dated Nov. 4, 2021, 4 pgs.

* cited by examiner

PRIOR-ART

ENHANCED SERVICE SYSTEM FOR A DRIVE THROUGH FACILITY

TECHNICAL FIELD

This disclosure relates generally to a drive through facility. More specifically, this disclosure relates to an enhanced service system for use in a drive through facility.

BACKGROUND

Drive through facilities such as drive through restaurants are well-known. In the wake of Covid-19, social distancing restrictions will increase the demand of drive through restaurant services as indoor dining becomes increasingly difficult. While infrastructure of some conventional facilities such as, but not limited to, restaurants of the drive-through type may somewhat i.e., partially, or ineffectively support the isolation of individual customers from each other, one or more aspects of interactions continue to remain required between customers and staff members of such restaurants i.e., largely human-driven in nature, and in many cases, these interactions occur at close distances and therefore, do not follow pandemic safety protocols.

SUMMARY

In an aspect of the present disclosure, there is provided an enhanced service system for a drive through facility. The enhanced service system comprises a wiring system having a pair of first wires disposed in a laterally spaced apart arrangement and extending longitudinally between a first position proximal to an entry point of the drive through facility and a second position proximal to a receiving window in the drive through facility. The enhanced service system further comprises an aerial host unit coupled to the pair of first wires using a pair of first and second host wires. The aerial host unit is movable in a longitudinal direction between the first position and the second position along a length of the first wires and includes an aerial host member moveably supported by the first and second host wires to move in a lateral direction between the pair of first wires to permit the aerial host member to approach an incoming customer vehicle, facilitate a customer to place an order, receive payment from the customer based on the placed order, and direct the customer to the receiving window where the aerial host member retrieves one or more items corresponding to the placed order from the receiving window and transfers the one or more items to the customer.

In another aspect of the present disclosure, a method is provided for installing and operating an enhanced service system for a drive through facility. The method comprises providing a wiring system having a pair of first wires in a laterally spaced apart arrangement and extending longitudinally between a first position proximal to an entry point of the drive through facility and a second position proximal to a receiving window in the drive through facility. The method further comprises moving an aerial host unit having an aerial host member in a longitudinal direction on the pair of first wires and moving the aerial host member in a lateral direction between the pair of first wires using a pair of first and second host wires to permit the aerial host member to approach an incoming customer vehicle, facilitate a customer to place an order, receive payment from the customer based on the placed order, and direct the customer to the receiving window where the aerial host member retrieves one or more items corresponding to the placed order from the receiving window and transfers the one or more items to the customer.

In yet another aspect, the present disclosure provides a non-transitory computer readable medium having computer-executable instructions stored thereon. These computer-executable instructions when executed by a processor in communication with an aerial host member of an aerial host unit, causes the aerial host member to approach an incoming customer vehicle, facilitate a customer of a drive through facility to place an order, receive payment from the customer based on the placed order, and direct the customer to a receiving window of the drive through facility where the aerial host member retrieves one or more items corresponding to the placed order from the receiving window and transfers the one or more items to the customer.

It will be appreciated that features of the present disclosure are susceptible to being combined in various combinations without departing from the scope of the present disclosure as defined by the appended claims.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

While certain specific features have been illustrated in the accompanying drawings, those skilled in the art will appreciate that various other features have been omitted i.e., not been illustrated for sake of brevity in the present disclosure and also to avoid obscuring more pertinent aspects of the present disclosure. Further, for sake of simplicity, the drive through facility will hereinafter be explained in conjucntion with a restaurant, however, it must be noted that such specific type of facility, or stated differently, an implementation of the facility in the specific form of a restaurant is merely illustrate and exemplary in nature and therefore, non-limiting of the present disclosure. In alternative implementations, embodiments of the present disclosure can be similarly, and equally, applied to other types of drive through facilities including, but not limited to, a drive through warehousing facility or other types of drive through facilities commonly known in the art without deviating from the spirit of the present dislcosure.

Moreover, a wiring system is disclosed in conjunction with the drive through restaurant of the present disclosure. This wiring system should be construed as forming part of a service system providing enhanced services including, inter alia, customer management, customer vehicle management and customer order fulfilment of the drive through facility. It should be noted that a scope of the present disclosure is not limited to any type or configuration of specific services that is disclosed in conjunction with the enhanced service system herein. Such examples of services is rather explanatory and non-limiting of this disclosure. Upon perusal of the present disclosure, persons skilled in the art will acknowledge that embodiments of the present disclosure can be similarly applied to other types or configurations of service systems for use in the drive through facility depending on one or more factors including, but not limited to, a type of the drive through facility, for instance, drive through restaurant, a drive through warehouse facility and other types of drive through facilites known in the art.

Figure 1:
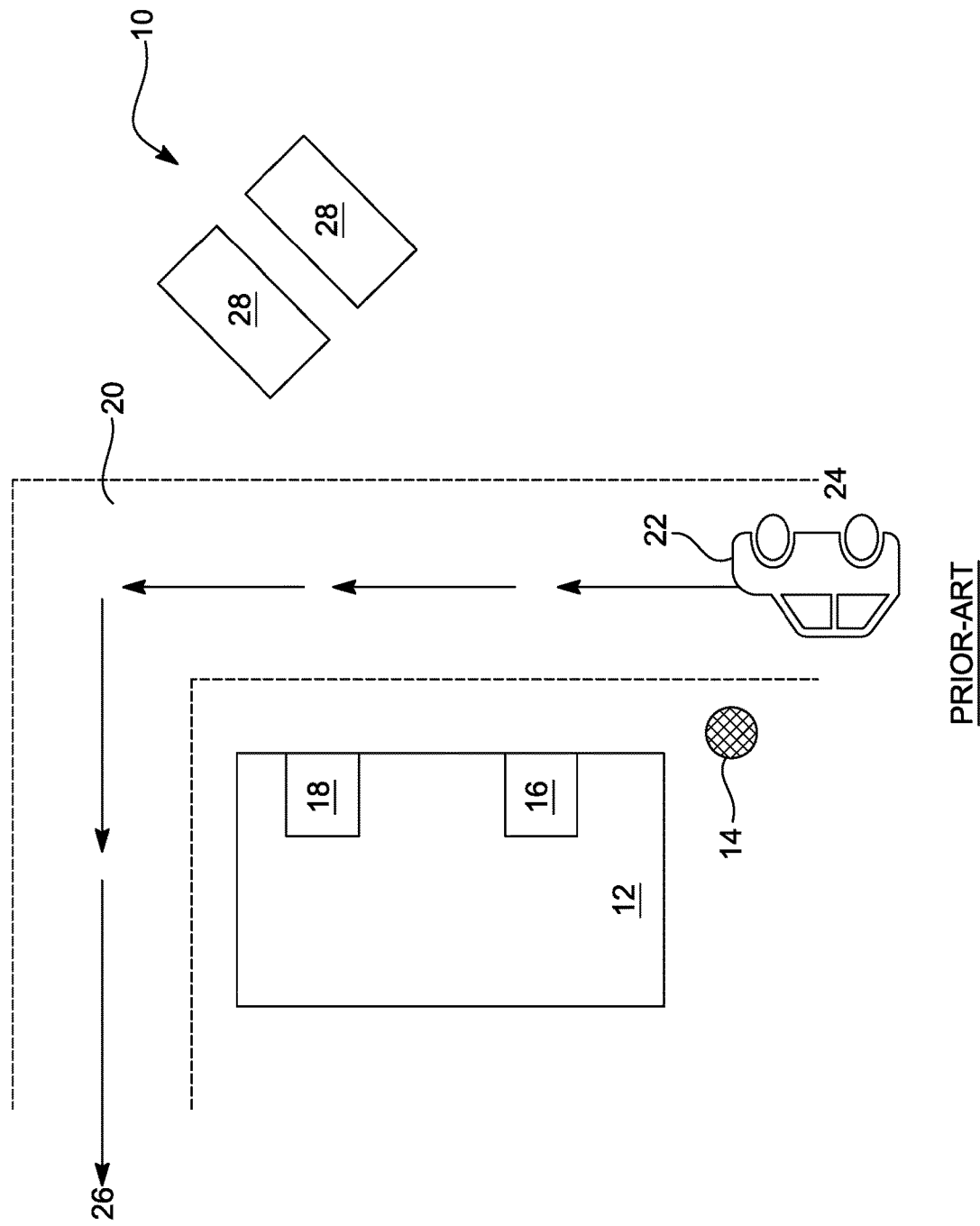
FIG. 1 is a block diagram of a prior art drive through restaurant.

Referring to FIG. 1, a conventional drive through restaurant 10 comprises a kiosk 12, a speaker unit 14, a payment window 16 and a receiving window 18. The speaker unit 14 may be integral with the kiosk 12, or may be rendered separate from the kiosk 12 as shown in the view of FIG. 1. Moreover, as shown, the kiosk 12 is at least partly encircled by a road 20 along which one or more customer vehicles 22 may be driven from an entry point 24 to an exit point 26 sequentially passing by the speaker 14, the payment window 16 and the receiving window 18 of the kiosk 12 along the way. That is, the speaker unit 14, the kiosk 12, the payment window 16, and the receiving window 18 may be located alongside i.e., to one side of the road 20.

On the other side of the road 20, the drive through restaurant 10 may further include one or more overflow parking bays 28 adapted to accommodate customers vehicles 22 additional to that travelling on the road 20. For purposes of this disclosure, it should be noted that an exact type or configuration of the parking bays 28 is merely exemplary in nature, and hence, non-limiting of this disclosure. In fact, upon perusal of the appended disclosure, it will be acknowledged by persons skilled in the art that various types and configurations of parking bays, for instance, underground, above-ground, single level or multi-level parking bays commonly known in the art may be easily and readily implemented for realizing embodiments and functionalities consistent with that of the present disclosure.

In use, a customer (not shown) drives the vehicle 22 from the entry point 24 to the speaker unit 14 and places an order for food items at the speaker unit 14. Upon placing the order, the customer drives the vehicle 22 further along the road 20 to the payment window 16 to make payment towards the order placed at the speaker unit 14 for the food items. Upon completion of the payment process at the payment window 16, the customer drives the vehicle 22 further along the same road 20 towards the receiving window 18 for retrieving, or collecting, the ordered food items. Thereafter, the customer may proceed to drive the vehicle 22 towards the exit point 26 for exiting the drive through restaurant 10 via the exit point 26.

The conventional drive through restaurant arrangement 10, as shown exemplarily in the view of FIG. 1, uses the vehicles 22 and their ordered progression along the road 20 to effectively isolate customers from each other. That is, the discreteness of individual vehicles 22 within the drive through restaurant arrangement 10 would provide for the required separation between the vehicles 22 themselves, and may therefore, only partially facilitate the isolation of customers from one another, especially, only if the customers strictly do not have to interact with i.e., not come in contact with, or even be in proximity to, staff members (not shown) or other personnel associated with the conventional drive through restaurant 10.

However, with use of such setups i.e., the conventional drive through restaurant arrangement 10, while paying for the placed order and retrieving, or collecting, them from the kiosk 12, customers typically come close to and may even have to interact with staff members or other personnel of the restaurant 10. In fact, in many cases, customers have been found to alight from their vehicles 22 and form groups, or become crowded, at, for example, the payment window 16 or the receiving window 18 of the kiosk 12. Accordingly, the conventional drive through restaurant arrangement 10 offers incomplete, or ineffective, social isolation insofar as it is configured to offer merely little or no isolation to the customers from one another and also the staff members or other personnel that may be associated with the drive through restaurant 10 of conventional design.

Figure 2:
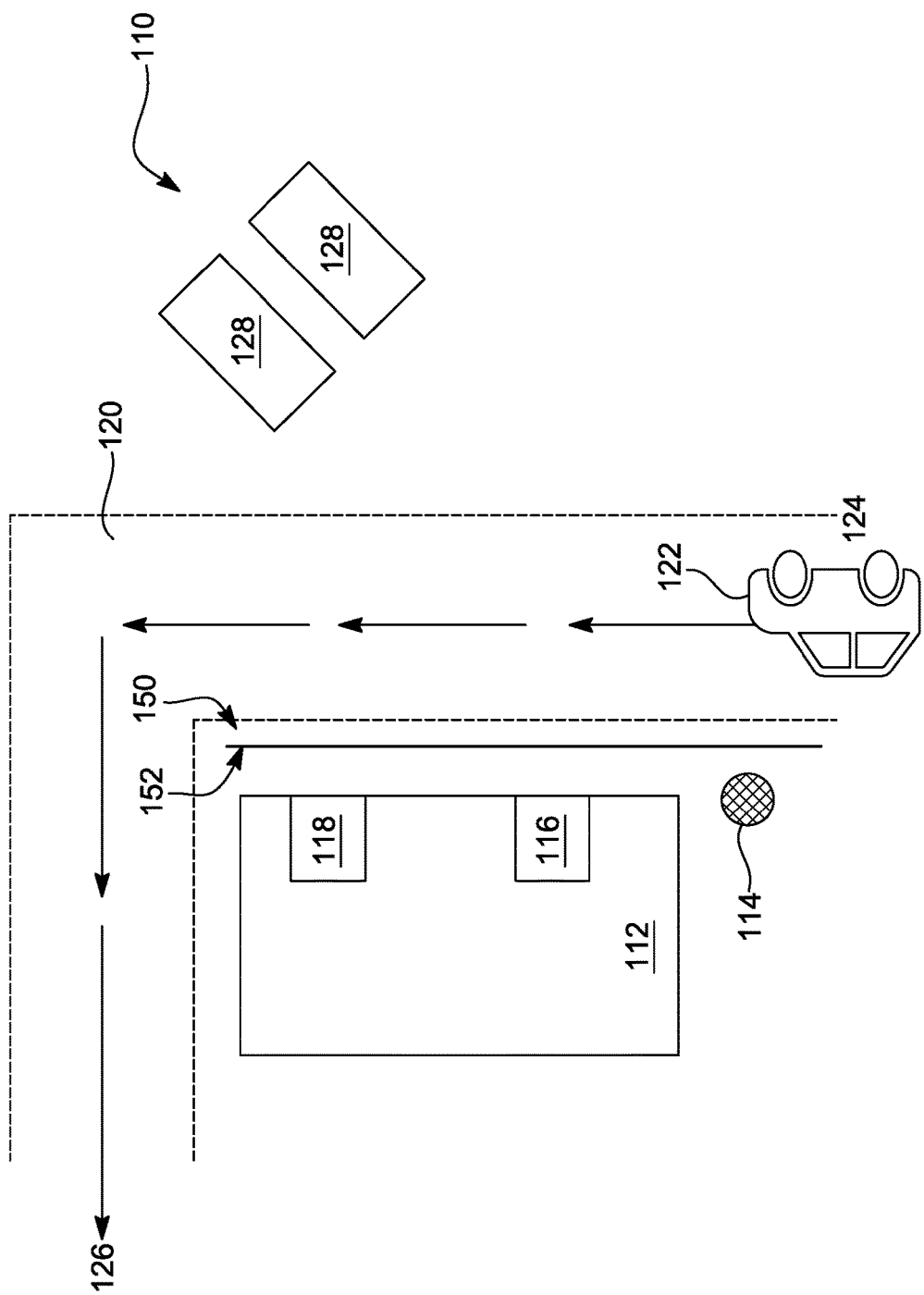
FIG. 2 is a block diagram of a drive through restaurant comprising a wiring system that forms part of an enhanced service system for the drive through restaurant, in accordance with an embodiment of the present disclosure.

Referring to FIG. 2, a drive through restaurant 110 is depicted in accordance with an embodiment of the present disclosure. The drive through restaurant 110 includes a service system 150 comprising a wiring system 152 disposed between the kiosk 112 and the road 120. As shown, the wiring system 152 extends from a first position located proximal to the speaker 114 to a second position located proximal to the receiving window 118.

Figure 3:
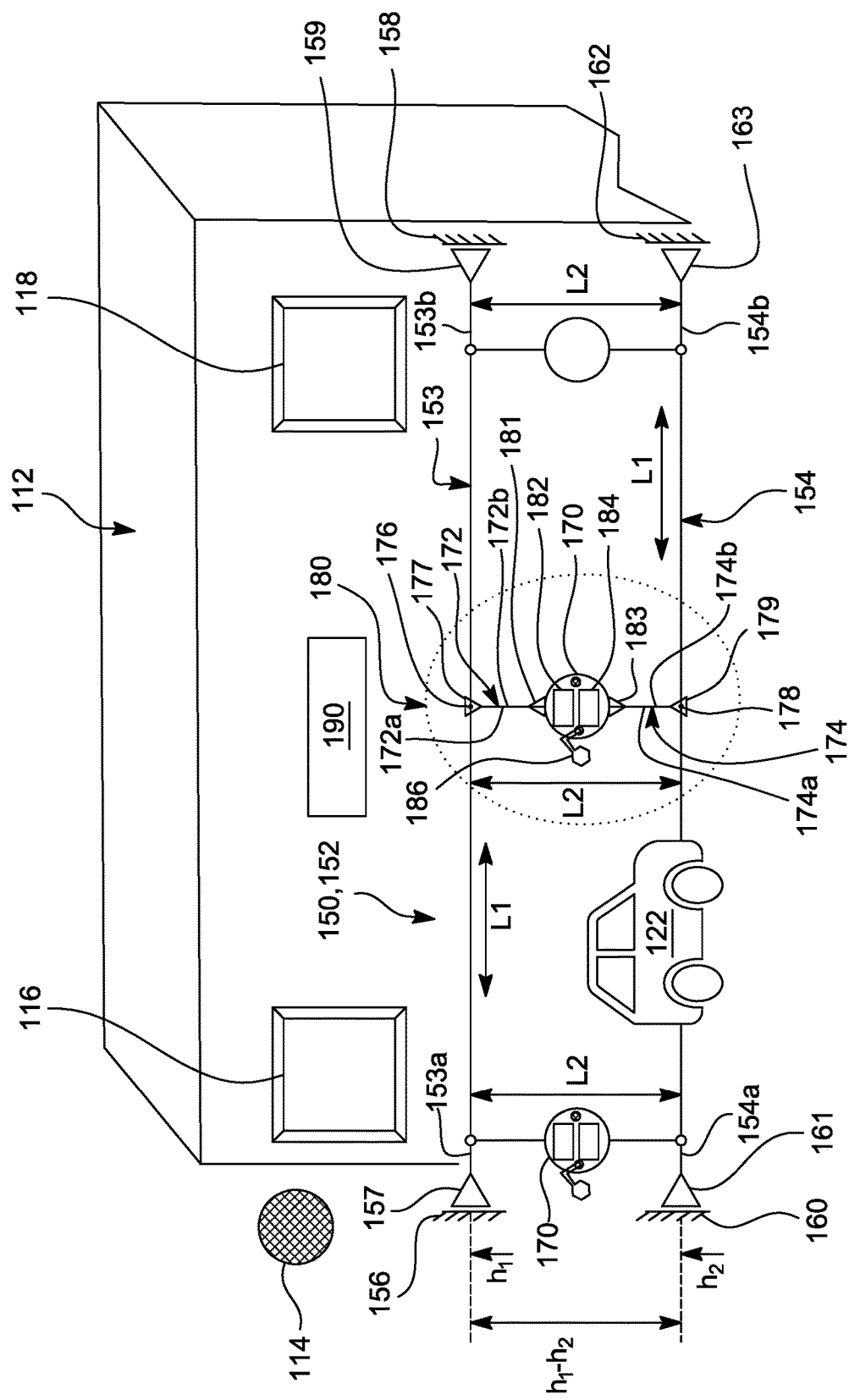
FIG. 3 is a side elevation view of the wiring system from FIG. 2 shown in use with a customer's vehicle.

Referring to FIG. 3, the wiring system 152 of the service system 110 comprises an upper wire 153 and a lower wire 154. The wiring system 152 further includes a first upper anchoring member 156 disposed at a first location proximal to the kiosk's speaker 114 and at an elevation $h_1$, a second upper anchoring member 158 disposed at a second location proximal to the kiosk's receiving window 118 at the elevation $h_1$ (corresponding to that used for the first upper anchoring member 156), a first lower anchoring member 160 disposed at the first location and at an elevation $h_2$, where $h_2 < h_1$ a second lower anchoring member 162 disposed at the second location and at an elevation $h_2$ (corresponding to that used for the first lower anchoring member 162).

Each anchoring member 156, 158, 160 and 162 comprises an electric stepper motor 157, 159, 161 and 163 (also referred to as 'first, second, third and fourth electric motors' and denoted using identical reference numerals 157, 159, 161 and 163 respectively). Each of the electric motors 157, 159, 161 and 163 includes a rotor (not shown). The rotor in the first electric motor 157 at the first upper anchoring member 156 is coupled with a first end 153a of the upper wire 153 and is arranged so that at least a portion of the upper wire 153 proximal to the first end 153a is wrapped around the rotor of the first electric motor 157 at the first upper anchoring member 156. The rotor in the second electric motor 159 at the second upper anchoring member 158 is coupled with a second end 153b of the upper wire 153 and is arranged so that at least a portion of the upper wire 153 proximal to the second end 153b is wrapped around the rotor of the second electric motor 159 at the second upper anchoring member 158.

Similarly, the rotor in the third electric motor 161 at the first lower anchoring member 160 is coupled with a first end 154a of the lower wire 154 and is arranged so that at least a portion of the lower wire 154 proximal to the first end 154a is wrapped around the rotor of the third electric motor 161 at the first lower anchoring member 160. The rotor in the fourth electric motor 163 at the second lower anchoring member 162 is coupled with a second end 154b of the lower wire 154 and is arranged so that at least a portion of the lower wire 154 proximal to the second end 154b is wrapped around the rotor of the fourth electric motor 163 at the second lower anchoring member 162.

Thus, the upper wire 153 extends at a substantially constant elevation of $h_1$ between the first and second electric motors 157, 159 at the first and second upper anchoring members 156, 158 respectively. Further, the lower wire 154 is aligned substantially parallel with the upper wire 153 and extends between the third and fourth electric motors 161, 163 at the first and second lower anchoring members 160, 162 at a substantially constant elevation of $h_2$.

The upper wire 153 further comprises one or more first suspension points 176 located at one or more first intermediary positions on the upper wire 153 between the first and second ends 153a, 153b of the upper wire 153. Similarly, the lower wire 154 further comprises one or more second suspension points 178 located at one or more second intermediary positions on the lower wire 154 between the first and second ends 154a, 154b of the lower wire 154.

Further, electric stepper motors 177, 179 are mounted onto the first and second suspension points 176, 178. For sake of simplicity in identification, the electric motors 177, 179 are also referred to as 'fifth and sixth electric motors' and denoted using identical reference numerals 177 and 179 respectively. Each of the fifth and sixth electric motors 177, 179 includes a rotor (not shown). The rotor in the fifth electric motor 177 mounted on the first suspension point 176 is coupled with a first end 172a of a first host wire 172 and is arranged so that at least a portion of the first host wire 172 proximal to the first end 172a is wrapped around the rotor of the fifth stepper motor 177 at the first suspension point 176. The rotor in the sixth stepper motor 179 mounted on the second suspension point 178 is coupled with a first end 174a of a second host wire 174 and is arranged so that at least a portion of the second host wire 174 proximal to the first end 174a is wrapped around the rotor of the sixth stepper motor 179 at the second suspension point 178.

The enhanced service system 150 further comprises one or more aerial host members 170. Each aerial host member 170 is provided with two electric motors 181, 183. For sake of simplicity in identification, the electric motors 181, 183 is also referred to as 'seventh and eight electric motors' and denoted using identical reference numerals 181 and 183 respectively. The seventh and eighth electric motor 181, 183 are mounted at distal ends of the aerial host member 170 facing the sixth and seventh electric motors 177, 179 at the first and second suspension points 176, 178 respectively.

Moreover, each of the seventh and eight electric motors 181, 183 includes a rotor (not shown). The rotor of the seventh electric motor 181 is coupled with the second end 172b of the first host wire 172 and is arranged so that at least a portion of the first host wire 172 proximal to the second end 172b is wrapped around the rotor of the seventh electric motor 181. The rotor of the eighth electric motor 183 is coupled with the second end 174b of the second host wire 174 and is arranged so that at least a portion of the second host wire 174 proximal to the second end 174b is wrapped around the rotor of the eighth electric motor 183.

Thus, each aerial host member 170 is effectively suspended between the first suspension point 176 and the second suspension point 178 by the corresponding pair of the first and second host wires 172, 174. In other words, the first host wire 172, the corresponding aerial host member 170 and the corresponding second host wire 174 collectively form the aerial host unit 180 spanning the distance ($h_1$-$h_2$) between the first suspension point 176 and the second suspension point 178 on the upper wire 153 and the lower wire 154 respectively.

The aerial host unit 180 is longitudinally movable between the first position and the second position through the synchronized operation of the electric stepper motors 157, 159, 161 and 163 at the anchoring members 156, 158, 160 and 162 to cause the upper wire 153 and the lower wire 154 coupled to each electric motor 157, 159 and 161, 163 to be further wound or unwound from the rotor of the corresponding electric motors 157, 159 and 161, 163, thereby shortening or lengthening each of the first wires 153, 154 respectively. In an embodiment herein, the first and second electric motors 157, 159 are synchronized to simultaneously move with respective ones of the third and fourth electric motors 161, 163 to cause coterminous movement of the upper and lower wires 153, 154 in a longitudinal direction 'L1' such that the upper and lower wires 153, 154 together move the aerial host unit 170 between the first and second positions.

The aerial host member 170 is laterally movable between elevations of $h_1$ and $h_2$ through the synchronized operation of the electric motors 177, 179, 181 and 183 at the first suspension point 176, the second suspension point 178, and the pair of distal ends of the aerial host member 170, proximal to the first and second suspension points 176, 178, to cause the first host wire 172 and corresponding second host wire 174 to be further wound or unwound from the rotors of the corresponding pair of electric motors 177, 181 and 179, 183 thereby shortening or lengthening each such wire 172, 174 respectively.

In an embodiment, the aerial host member 170 may further include:
 a visual display unit 182 operable through:
  a menu display routine to display a menu of items to the customer;
  an order taking routine adapted to allow the customer to place an order for one or more items from the menu;
  a billing routine adapted to calculate the bill for the items in the order placed by the customer;
  a bill display routine adapted to display the bill to the customer;
 a contactless card reader unit 184, for example, a radio frequency (RF) tag reader or a near field tag reader in communication with the visual display unit 182, the contactless card reader unit 184 operable through a payment routine adapted to receive contactless payment from the customer from, use of, their payment card in a contactless manner, for example, using an RF or near field communication enabled payment device (not shown).

With combined reference to FIGS. 2 and 3, in use, on entering the drive through restaurant 110, the customer's vehicle 122 is approached by the aerial host member 170 and the customer is presented with the menu on the visual display unit 182 from which they may place an order for one or more food items. The aerial host member 170 calculates the bill and requests payment for the ordered items. On receipt of payment by the aerial host member 170 through the contactless card reader unit 184, the aerial host member 170 directs the customer to proceed by driving the vehicle 122 towards the receiving window 118 to retrieve the one or more food items corresponding to their placed order.

The enhanced service system 150 further comprises an alarm system (not shown). Also, the enhanced service system 150 further comprises one or more video cameras (not shown) positioned to monitor the area between the first and second upper and lower anchoring members 156, 158, 160 and 162 of the wiring system 152. The video cameras may be configured with an object detection routine, adapted to recognise the presence of any object, for example, a customer's hand or another body part intruding an area, or better yet, a spatial volume corresponding to a combined field of view of the cameras between the anchoring members 156, 158, 160 and 162. The detection of any object causes the rotors to stop, thereby stopping movement of the enhanced service system 150 and preventing risk of injury to the customers, staff-members or other by-standers to the enhanced service system 150. Moreover, upon detection of any intruding object, the alarm system may provide a notification, in the form of e.g., audible sounds, to the staff members and/or management of the drive through restaurant facility 110 to notify of and/or avert any potential untoward incident that may occur. The aforementioned functional aspects of the enhanced service system 150 can be configured to suit specific requirements of a drive through facility management application.

In fact, it is hereby contemplated that in an embodiment herein, the aerial host member 170 of the enhanced service system 150 may additionally be provided with a robotic gripping device 186 to facilitate the retrieval, or collection, of items corresponding to the placed order from the receiving window 118 and transfer such retrieved, or collected, items to the customer, for example, when the robotic gripping device 186 brings the retrieved, or collected, items close to a window of the customer's vehicle 122 so that the customer may, in turn, collect such items from the robotic gripping device 186 without interacting directly with i.e., coming into contact, or even in proximity, with the staff members at the receiving window 118, or any other portion, of the kiosk 112 in the drive through restaurant 110 thereby effectively isolating the customers from the staff members. This eliminates, or at least mitigates, any possibility, or requirement, on the part of the customer to interact with staff members or other personnel associated with the drive through restaurant 110.

It should be noted that the enhanced service system 150 of the present disclosure may also include a control unit 190 having one or more controllers to individually, or collectively, control operation of the various electric stepper motors 157, 159, 161, 163, 177, 179, 181, 183, the aerial host member 170, the video cameras, the alarm system, and the robotic gripping device 186 in a manner consistent with that disclosed herein. These processors, micro-processors, controllers, micro-controllers, and actuators of the control unit 190 may be readily embodied in the form of one or more general purpose, or application specific, processors, micro-processors, computers that can be readily implemented for use in operating the enhanced service system 150 of the present disclosure. Further, these controllers may include processors, micro-processors, micro-controllers, actuators and the like that are configured to execute one or more computer program instructions for enabling the enhanced service system 150 to operate autonomously without requiring manual intervention, or control, by the staff members or other personnel associated with the drive through restaurant 110.

Figure 4:
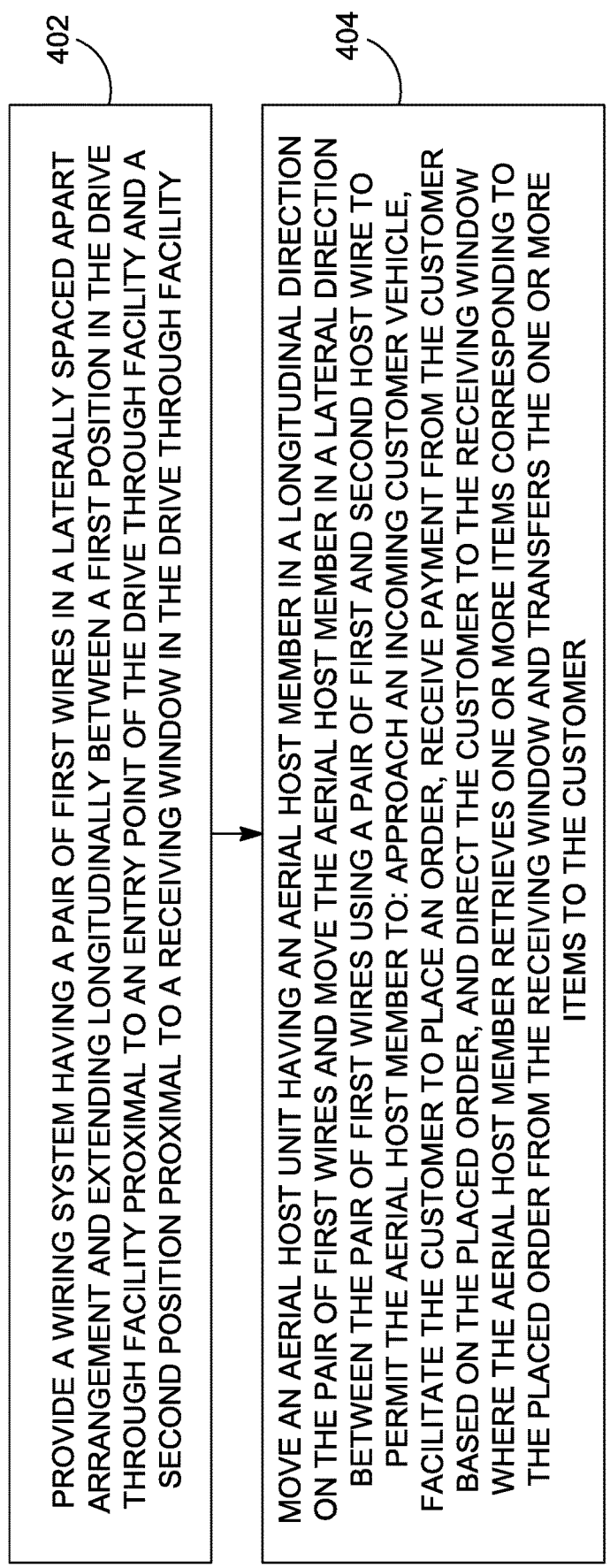
FIG. 4 is a flowchart depicting steps of a method for installing and operating the enhanced service system of the present disclosure, in accordance with an embodiment of the present disclosure.

Referring now to FIG. 3 in conjunction with FIG. 4, a method 400 is provided for installing and operating the enhanced service system 150 for the drive through facility 110.

As shown in FIG. 4, at step 402, the method 400 comprises providing the wiring system 152 having the pair of first wires 153, 154 in a laterally spaced apart arrangement and extending longitudinally between the first position proximal to the entry point 124 of the drive through facility 110 and a second position proximal to the receiving window 118 in the drive through facility 110.

At step 404, the method 400 further comprises moving the aerial host unit 180, having the aerial host member 170, in the longitudinal direction 'L1' on the pair of first wires 153, 154 and moving the aerial host member 170 in the lateral direction 'L2' between the pair of first wires 153, 154 using the pair of first and second host wires 172, 174 to permit the aerial host member 170 to approach an incoming customer vehicle 122, facilitate the customer to place an order, receive payment from the customer based on the placed order, and direct the customer to the receiving window where the aerial host member 170 retrieves one or more items corresponding to the placed order from the receiving window 118 and transfers the one or more items to the customer.

The method 400 also includes positioning the laterally spaced apart pair of first wires 153, 154 in a co-planar vertical arrangement, and wherein the pair of first wires 153, 154 includes the upper wire 153 and the lower wire 154 respectively.

The method 400 also includes providing the first and second upper anchoring members 156, 158 for supporting the longitudinally extending upper wire 153 between the first and second positions. Further, the method 400 also includes providing the first and second lower anchoring members 160, 162 for supporting the longitudinally extending lower wire 154 between the first and second positions and in the laterally spaced apart arrangement with respect to the upper wire 153.

The method 400 also includes mounting the first electric motor 157 at the first upper anchoring member 156 and coupling the first electric motor 157 to the first end 153a of the upper wire 153. The method 400 also includes mounting the second electric motor 159 at the second upper anchoring member 158 and coupling the second electric motor 159 to the second end 153b of the upper wire 153. The method 400 also includes mounting the third electric motor 161 at the first lower anchoring member 160 and coupling the third electric motor 161 to the first end 154a of the lower wire 154. The method 400 also includes mounting the fourth electric motor 163 mounted at the second lower anchoring member 162 and coupling the fourth electric motor 163 to the second end 154b of the lower wire 154.

The method 400 also includes mounting the fifth electric motor 177 at the first suspension point 176 located at a first intermediary position on the upper wire 153 between the first and second electric motors 157, 159 and coupling the fifth electric motor 177 to the first end 172a of the first host wire 172. The method 400 also includes mounting the sixth electric motor 179 at the second suspension point 178 located at a second intermediary position on the lower wire 154 between the third and fourth electric motors 161, 163 and coupling the sixth electric motor 179 to the first end 174a of the second host wire 174.

The method 400 also includes mounting the seventh electric motor 181 at a first distal end of the aerial host member 170 proximal to the first suspension point 176 and coupling the the seventh electric motor 181 to the second end 172b of the first host wire 172. The method 400 also includes mounting the eighth electric motor 183 at a second distal end of the aerial host member 170 proximal to the second suspension point 178 and coupling the eighth electric motor 183 to the second end 174b of the second host wire 174.

The method 400 also includes providing the control unit 190 having one or more controllers in communication with the electric motors 157, 159, 161, 163, and 177, 179, 181, 183 respectively for controlling the movement of the aerial host unit 180 in the longitudinal direction 'L1' and the aerial host member 170 in the lateral direction 'L2'.

The method 400 also includes providing one or more video cameras in communication with the control unit 190, using the video cameras to monitor the area between the first and second positions, and using the control unit 190 to stop movement of the aerial host unit 180 and the aerial host member 170 on detection of an obstacle intruding within the area between the pair of first wires 153, 154.

The method 400 further includes mounting on the aerial host member 170, the visual display unit 182 adapted to display the menu of items to the customer, allow the customer to place the order for one or more items from the menu, calculate a bill for the placed order, and display the bill to the customer. The method 400 further includes mounting the contactless card reader unit 184 on the aerial host member 170 to receive contactless payment from the customer through their payment card.

Modifications to embodiments of the present disclosure described in the foregoing are possible without departing from the scope of the present disclosure as defined by the accompanying claims. Expressions such as "including", "comprising", "containing", "consisting", "have" is used to describe and claim the present disclosure are intended to be construed in a non-exclusive manner, namely allowing for items, components or elements not explicitly described also to be present. Reference to the singular is also to be construed to relate to the plural.

The invention claimed is:

1. An enhanced service system for a drive through facility, the enhanced service system comprising:
a wiring system comprising:
a pair of first wires in a laterally spaced apart arrangement and extending longitudinally between a first position proximal to an entry point of the drive through facility and a second position proximal to a receiving window in the drive through facility; and
an aerial host unit coupled to the pair of first wires using a pair of first and second host wires, wherein the aerial host unit is movable in a longitudinal direction between the first position and the second position along a length of the pair of first wires and the aerial host unit includes an aerial host member moveably supported by the first and second host wires to move in a lateral direction between the pair of first wires to permit the aerial host member to:
approach an incoming customer vehicle,
facilitate a customer to place an order,
receive payment from the customer based on the placed order, and
direct the customer to the receiving window where the aerial host member retrieves one or more items corresponding to the placed order from the receiving window and transfers the one or more items to the customer.

2. The enhanced service system of claim 1, wherein the laterally spaced apart arrangement of the pair of first wires includes a co-planar vertical arrangement of the pair of first wires, and wherein the pair of first wires includes an upper wire and a lower wire respectively.

3. The enhanced service system of claim 2 further comprising:
first and second upper anchoring members for supporting the longitudinally extending upper wire between the first and second positions; and
first and second lower anchoring members for supporting the longitudinally extending lower wire between the first and second positions and in the laterally spaced apart arrangement with respect to the upper wire.

4. The enhanced service system of claim 3 further comprising:
a first electric motor mounted at the first upper anchoring member and coupled to a first end of the upper wire;
a second electric motor mounted at the second upper anchoring member and coupled to a second end of the upper wire;
a third electric motor mounted at the first lower anchoring member and coupled to a first end of the lower wire; and
a fourth electric motor mounted at the second lower anchoring member and coupled to a second end of the lower wire.

5. The enhanced service system of claim 4, wherein the first and second electric motors are synchronized to simultaneously move with respective ones of the third and fourth electric motors to cause coterminous movement of the upper and lower wires in the longitudinal direction such that the upper and lower wires together move the aerial host unit between the first and second positions.

6. The enhanced service system of claim 4, wherein the aerial host unit comprises:
a fifth electric motor mounted at a first suspension point located at a first intermediary position on the upper wire between the first and second electric motors, wherein the fifth electric motor is coupled to a first end of the first host wire;
a sixth electric motor mounted at a second suspension point located at a second intermediary position on the lower wire between the third and fourth electric motors, wherein the sixth electric motor is coupled to a first end of the second host wire;
a seventh electric motor mounted at a first end of the aerial host member proximal to the first suspension point, wherein the seventh electric electric motor is coupled to a second end of the first host wire; and
an eighth electric motor mounted at a second distal end of the aerial host member proximal to the second suspension point, wherein the eighth electric electric motor is coupled to a second end of the second host wire.

7. The enhanced service system of claim 6, wherein the fifth, sixth, seventh and eighth electric motors are synchronized to simultaneously cause coterminous movement of the first and second host wires in the lateral direction such that the first and second host wires together move the aerial host unit between the pair of first wires.

8. The enhanced service system of claim 7 further comprising a control unit having one or more controllers in communication with each of the first, second, third, fourth, fifth, sixth, seventh, and eighth electric motors.

9. The enhanced service system of claim 8 further comprising one or more video cameras disposed in communication with the control unit, the video cameras configured to monitor an area between the first and second positions, and wherein the control unit is configured to stop movement of the aerial host unit and the aerial host member on detection of an obstacle intruding within the area between the pair of first wires.

10. The enhanced service system of claim 1, wherein the aerial host member includes:
  a visual display unit adapted to display a menu of items to the customer, allow the customer to place the order for one or more items from the menu, calculate a bill for the placed order, and display the bill to the customer; and
  a contactless card reader unit adapted to receive contactless payment from the customer through their payment card.

11. The enhanced service system of claim 1, wherein the aerial host member includes a robotic gripping device adapted to:
  retrieve one or more items corresponding to the placed order from the receiving window; and
  transfer the retrieved one or more items to the customer.

12. A method for installing and operating an enhanced service system for a drive through facility, the method comprising:
  providing a wiring system having a pair of first wires in a laterally spaced apart arrangement and extending longitudinally between a first position in the drive through facility proximal to an entry point of the drive through facility and a second position proximal to a receiving window in the drive through facility; and
  moving an aerial host unit having an aerial host member in a longitudinal direction on the pair of first wires and moving the aerial host member in a lateral direction between the pair of first wires using a pair of first and second host wires to permit the aerial host member to:
    approach an incoming customer vehicle,
    facilitate a customer to place an order,
    receive payment from the customer based on the placed order, and
    direct the customer to the receiving window where the aerial host member retrieves one or more items corresponding to the placed order from the receiving window and transfers the one or more items to the customer.

13. The method of claim 12 further comprising positioning the laterally spaced apart pair of first wires in a co-planar vertical arrangement, and wherein the pair of first wires includes an upper wire and a lower wire respectively.

14. The method of claim 13 further comprising providing:
  first and second upper anchoring members for supporting the longitudinally extending upper wire between the first and second positions; and
  first and second lower anchoring members for supporting the longitudinally extending lower wire between the first and second positions and in the laterally spaced apart arrangement with respect to the upper wire.

15. The method of claim 14 further comprising:
  mounting a first electric motor at the first upper anchoring member and coupling the first electric motor to a first end of the upper wire;
  mounting a second electric motor at the second upper anchoring member and coupling the second electric motor to a second end of the upper wire;
  mounting a third electric motor at the first lower anchoring member and coupling the third electric motor to a first end of the lower wire; and
  mounting a fourth electric motor at the second lower anchoring member and coupling the fourth electric motor to a second end of the lower wire.

16. The method of claim 15, wherein the aerial host unit comprises:
  mounting a fifth electric motor at a first suspension point located at a first intermediary position on the upper wire between the first and second electric motors and coupling the fifth electric motor to a first end of the first host wire;
  mounting a sixth electric motor at a second suspension point located at a second intermediary position on the lower wire between the third and fourth electric motors and coupling the sixth electric motor to a first end of the second host wire;
  mounting a seventh electric motor at a first distal end of the aerial host member proximal to the first suspension point and coupling the seventh electric electric motor to a second end of the first host wire; and
  mounting an eighth electric motor at a second distal end of the aerial host member proximal to the second suspension point and coupling the eighth electric electric motor to a second end of the second host wire.

17. The method of claim 16 further comprising providing a control unit having one or more controllers in communication with the each of the first, second, third, fourth, fifth, sixth, seventh and eighth electric motors.

18. The method of claim 17 further comprising:
  providing one or more video cameras in communication with the control unit,
  using the video cameras to monitor an area between the first and second positions, and
  using the control unit to stop movement of the aerial host unit and the aerial host member on detection of an obstacle intruding within the area between the pair of first wires.

19. The method of claim 12 further comprising mounting on the aerial host member:
  a visual display unit to display a menu of items to the customer, allow the customer to place the order for one or more items from the menu, calculate a bill for the placed order, and display the bill to the customer; and
  a contactless card reader unit to receive contactless payment from the customer through their payment card.

* * * * *